US007669026B2

(12) United States Patent
Boss et al.

(10) Patent No.: US 7,669,026 B2
(45) Date of Patent: *Feb. 23, 2010

(54) SYSTEMS AND METHODS FOR MEMORY MIGRATION

(75) Inventors: Gregory Jensen Boss, American Fork, UT (US); Christopher James Dawson, Arlington, VA (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/053,832

(22) Filed: Mar. 24, 2008

(65) Prior Publication Data

US 2008/0172539 A1 Jul. 17, 2008

Related U.S. Application Data

(63) Continuation of application No. 11/174,959, filed on Jul. 5, 2005, now Pat. No. 7,529,903.

(51) Int. Cl.
*G06F 12/02* (2006.01)
(52) U.S. Cl. ...................................... 711/165
(58) Field of Classification Search ........................ None
See application file for complete search history.

(56) References Cited

U.S. PATENT DOCUMENTS 5,313,631 A * 5/1994 Kao ........................... 707/204
5,579,507 A * 11/1996 Hosouchi et al. ............ 711/171
5,644,766 A 7/1997 Coy et al.
5,893,139 A * 4/1999 Kamiyama .................. 711/117
6,269,382 B1 7/2001 Cabrera et al.

(Continued)

FOREIGN PATENT DOCUMENTS

EP          0 515 073 A2    11/1992
WO       WO 02/25445 A2     3/2002

OTHER PUBLICATIONS

N. Hurley, "Veritas Software: The Foundation for Tiered Storage," Enterprise Strategy Group, (Online) Apr. 2005, pp. 1-5.

(Continued)

*Primary Examiner*—Reginald G Bragdon
*Assistant Examiner*—Eric Loonan
(74) *Attorney, Agent, or Firm*—William H. Steinberg; Schubert Osterrieder & Nickelson PLLC (57) ABSTRACT

Systems, methods and media for performing auto-migration of data among a plurality of memory devices are disclosed. In one embodiment, memory access of application program data is monitored for each of one or more application programs. The data may be stored in one or more of a plurality of memory storage devices, each with its own performance characteristics. Monitored access is evaluated to determine an optimal distribution of the application programs data, typically stored in files, among the plurality of memory storage devices. The evaluation takes into account service level requirements of each application program. Periodically, data may be automatically transferred from one memory storage device to another to achieve the determined optimal allocation among the available memory storage devices consistent with service level requirements.

19 Claims, 3 Drawing Sheets

U.S. PATENT DOCUMENTS

| 6,374,327 | B2 | 4/2002 | Sakaki et al. |
| 6,754,895 | B1 | 6/2004 | Bartel et al. |
| 2003/0039148 | A1 | 2/2003 | Riedle |
| 2004/0133608 | A1 | 7/2004 | Saake et al. |

OTHER PUBLICATIONS

Baird, R., et al., "Distributed Information Storage Architecture," 12th IEEE Symposium on Mass Storage Architecture, Apr. 26, 1993, pp. 145-155.

M. Drakard, "Dynamic Storage Infrastructure," BT Technology Journal, vol. 23, No. 3, (Online), XP-002406041, Jul. 1, 2005, pp. 59-64.

ISR including PCT transmittal, From the International Searching Authority, mailed Dec. 5, 2006, Applicant: International Business Machines Corporation, International Application No. PCT/EP2006/063814, pp. -5.

ISR including PCT transmittal, From the International Searching Authority, mailed Dec. 5, 2006, Applicant: International Business Machines Corporation, International Application No. PCT/EP2006/063814, pp. -5.

* cited by examiner

SYSTEMS AND METHODS FOR MEMORY MIGRATION

This application is a continuation of U.S. application Ser. No. 11/174,959, filed Jul. 5, 2005 now U.S. Pat. No. 7,529,903.

FIELD

The present invention is in the field of computer storage. More particularly, the invention relates to automatically controlled storage migration.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many such systems to increase performance in a relatively cost-effective manner. Many modern computers also support "multi-tasking" or "multi-threading" in which two or more programs, or threads of programs, are run in alternation in the execution pipeline of the digital processor. A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Storage is a critical component of almost every software application in existence today. As the storage industry has matured, the number of storage options and the performance of data entry and retrieval have significantly increased. Storage options include magnetic tape, hard disk drives (HDD), Compact Disk (CD), Digital Versatile Disk (DVD), and other media. Within the category of hard disk drives, a wealth of storage options exist, ranging from simple and less reliable standalone HDDs to high performance, redundant disk arrays. This complicates virtual storage environments. Primary metrics of disk arrays include access speed, and redundancy. Complicated virtual storage environments include storage architectures that extend beyond a single computing environment. Such environments include Storage Area Networks (SAN). Each storage mechanism has an associated cost and service level, both of which may widely vary.

In practice, many application programs experience peak periods of use, and consequently, more stringent service level requirements. These programs experience periods of relatively low use during off-peak periods, with consequent lower service level requirements during off-peak periods. An application program developer must decide what storage mechanisms will be required by an application program based on anticipated use, costs, service level requirements, as well as other factors. For example, a backup/recovery system may call for a high service level storage subsystem to store files that are used frequently, or are of high importance, the loss of which may be critically detrimental. Often, the anticipated needs vary from the actual needs that develop when the program is installed. Additionally, storage needs may change overtime.

Currently, when anticipated needs of an application program are different from actual needs, an application program administrator requests a change in storage service from a storage administrator. Such changes are disruptive and require down-time to physically move files from one storage subsystem to another, to reclaim underutilized storage, and to provide additional storage. Changing needs may also call for a change in storage layout. Altering the layout typically involves migration of files temporarily to facilitate an alternate storage layout to meet changing demands. What is therefore needed is a way of automatically migrating files from one memory subsystem to another with little or no disruption of application program use.

SUMMARY

The problems identified above are in large part addressed by systems, methods and media for auto-migration of data between multiple storage devices. One embodiment comprises monitoring access of application program data stored in one or more of the multiple memory storage devices for one or more application programs. Also, the process determines service level specifications for one or more application programs. The method comprises determining from monitored access and service level specifications a change in memory allocation for the data of one more of the application programs. Data is automatically transferred between multiple memory storage devices to achieve an allocation of the data among the plurality of multiple storage devices according to the determined change in storage allocation.

Embodiments include an auto-migration memory storage system comprising a plurality of memory storage units each associated with a pre-determinable performance characteristic. A data store stores service level specifications for one or more application programs. A monitoring component monitors access of data of application programs stored in at least one of the memory storage units. An analysis component determines from the monitored access and service level specifications a reallocation of data among the plurality of memory storage units. A transfer control component transfers data from one memory storage unit to another in response to the determined reallocation.

Another embodiment of the invention provides a machine-accessible medium containing instructions effective, when executing in a data processing system, to cause the system to perform a series of operations for performing memory auto-migration. The operations comprise monitoring access of application program data stored in one or more of the multiple memory storage devices for one or more application programs. Also, the operations include determining service level specifications for one or more application programs. The operations also comprise determining from monitored access and service level specifications a change in memory storage allocation for the data of one or more of the application programs. Data is automatically transferred between multiple memory storage devices to achieve an allocation of the data among the plurality of multiple storage devices according to the determined change memory allocation.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for performing auto-migration of data among a plurality of memory devices are disclosed. In one embodiment, memory access of application program data is monitored for each of one or more application programs. The data may be stored in one or more of a plurality of memory storage devices, each with its own performance characteristics. Monitored access is evaluated to determine an optimal distribution of the application programs data, typically stored in files, among the plurality of memory storage devices. The evaluation takes into account service level specifications of each application program. Periodically, data may be automatically transferred from one memory storage device to another to achieve the determined optimal allocation among the available memory storage devices consistent with service level specifications.

Figure 1:
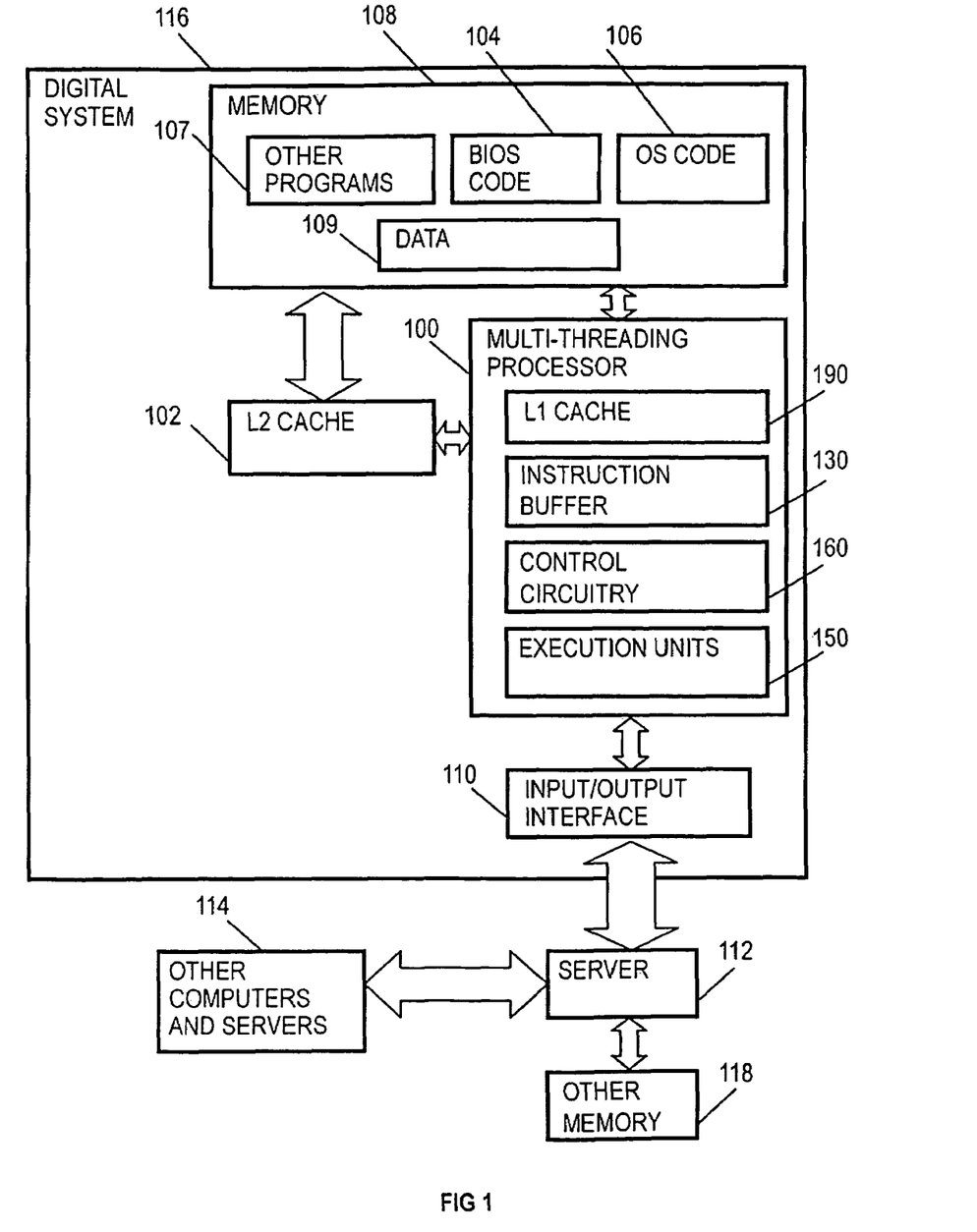
FIG. 1 depicts an embodiment of a digital system within a network; within the digital system is a processor.

FIG. 1 shows a digital system 116 such as a computer or server implemented according to one embodiment of the present invention. Digital system 116 comprises a processor 100 that can operate according to basic input-output system (BIOS) Code 104 and Operating System (OS) Code 106. The BIOS and OS code is stored in memory 108. The BIOS code is typically stored on Read-Only Memory (ROM) and the OS code is typically stored on the hard drive of computer system 116. Memory 108 also stores other programs for execution by processor 100 and stores data 109. Digital system 116 comprises a level 2 (L2) cache 102 located physically close to multi-threading processor 100.

Processor 100 comprises an on-chip level one (L1) cache 190, an instruction buffer 130, control circuitry 160, and execution units 150. Level 1 cache 190 receives and stores instructions that are near to time of execution. Instruction buffer 130 forms an instruction queue and enables control over the order of instructions issued to the execution units. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions received from instruction buffer 130. Control circuitry 160 controls instruction buffer 130 and execution units 150. Control circuitry 160 also receives information relevant to control decisions from execution units 150. For example, control circuitry 160 is notified in the event of a data cache miss in the execution pipeline.

Digital system 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a local intranet. Further, server 112 may control access to another memory 118 comprising tape drive storage, hard disk arrays, RAM, ROM, etc.

In one mode of operation of digital system 116, the L2 cache receives from memory 108 data and instructions expected to be processed in a pipeline of processor 100. L2 cache 102 is fast memory located physically close to processor 100 to achieve greater speed. The L2 cache receives from memory 108 the instructions for a plurality of instruction threads. Such instructions may include branch instructions. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Each of the units may be adapted to execute a specific set of instructions. Instructions can be submitted to different execution units for execution in parallel. In one embodiment, two execution units are employed simultaneously to execute certain instructions. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

Thus, the system of FIG. 1 may include a plurality of computers with processors and memory as just described, connected in a network served by a server. The server facilitates and coordinates communications between the computers in the network. Each computer has its own memory for storing its operating system, BIOS, and code for executing application programs, as well as files and data. The memory of a computer comprises Read-Only-Memory (ROM), cache memory implemented in DRAM and SRAM, a hard disk drive, CD drives and DVD drives. The server also has its own memory and may control access to other memory such as tape drives and hard disk arrays. Each computer may store its own application programs. Some application programs, such as databases, may reside in the server. Thus, each computer may access the same database stored in the server. In addition, each computer may access other memory by way of the server. A memory gradation therefore exists, with faster and more costly memory close to the processors of the computers and server, and slower, cheaper memory further away from the processors.

In the course of operation of the system of FIG. 1, data is moved from one memory location to another. For example, data may be moved from a processor's local cache to a hard drive system memory. Data is typically organized into files on the hard drives. Files may contain text, objects, computer code, etc. Thus, some data files will be stored on a computer's hard drive. Other files may be stored on a CD or DVD. Backup memory devices may also be removably connected to the computer to backup data from the hard drive. In larger systems, some data files may be backed up to a tape accessed through server 112. Other magnetic or optical memory may be employed.

Generally, memory access speed increases with increasing proximity to the processor. Thus, cache memory access is faster than fast disk access which is faster than remote disk access which is faster than offline storage access. Conversely, memory decreases in cost as memory access speed decreases. Thus, cache memory is more costly than fast disk, etc. Also, memory size increases with decreasing memory speed. Thus, for example, fast disk is larger than cache memory. Generally, therefore, data that is used or modified frequently will preferably reside in cache or fast disk. Data used or modified less frequently may reside in remote disk array. Data that is to be archived for some period of time may be stored on tape by a tape drive system.

Memory use is an important component in the development of software. Software developers write software in anticipation of available memory and expected use. For example, a software developer may anticipate that only some files of the total number of files on a program CD will be used in a typical installation. Accordingly, a setup program may load onto the hard drive only some of the program files from the program CD. When the user selects a feature not loaded on the hard drive, the user is prompted to insert the program CD to retrieve the files that implement the selected feature. Clearly, a software developer may misapprehend actual use of memory in the course of operation of the software. Thus, embodiments can automatically adapt memory allocation according to actual use.

Often, data files generated and manipulated by an application program are stored on the hard drive of a computer. These files contain data and instructions that may be called into the computer's cache for processing. In the course of operation, certain files will become dormant—that is, the files will not be used for a relatively long time. These files can then be stored in more distant memory, such as a disk array, that is lower in cost and has more room available. Files that are dormant in a disk array might then be transferred to tape storage. Embodiments therefore comprise a system that monitors memory usage, compiles usage statistics, and transfers files from one memory device to another according to usage.

Figure 2:
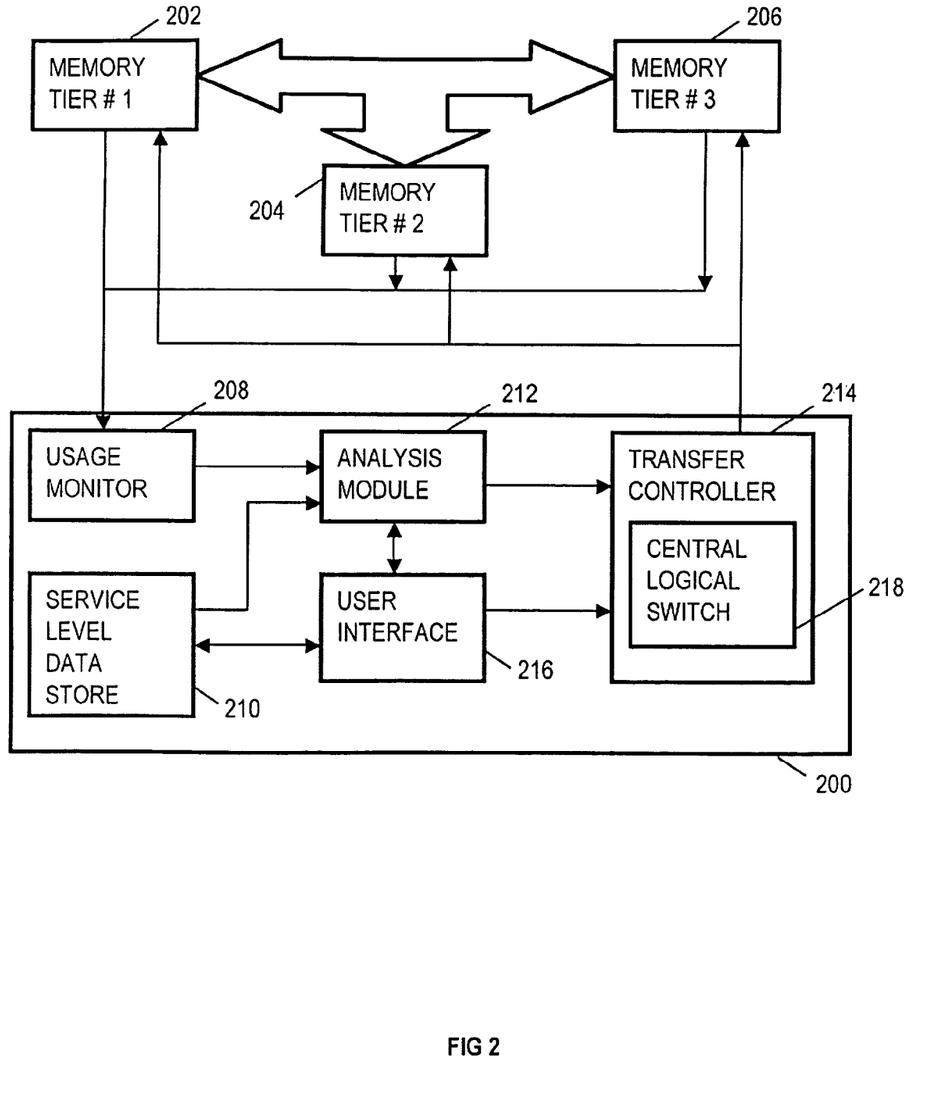
FIG. 2 depicts an embodiment of a system for auto-migration of data among a plurality of memory storage devices.

FIG. 2 shows an embodiment 200 for monitoring memory usage and allocating memory dynamically. Generally, memory may be described and implemented in tiers. For example, memory may be cache memory, fast disk, remote disk, and offline storage. Cache memory is close to a computer processor and may typically be implemented in fast Random Access Memory (RAM). Fast disk storage, such as a hard drive is local to the processor. Remote disk arrays may also be employed as a third tier of memory with possibly multiple computers accessing the array. The fourth tier—offline storage—comprises magnetic tape. Offline storage serves as an archive for data that should be saved but is likely to be seldom used.

Three tiers of memory 202, 204 and 206 are shown although a different number of tiers may be supported. For example, memory tier #1 may comprise fast disk, memory tier #2 may comprise remote disk, and memory tier #3 may comprise tape drive. Other tiers may include cache memory, backup media, etc. Data may be transferred from one tier to another. In one embodiment, data may be transferred between tiers 1 and 2, 1 and 3, and 2 and 3. The transfer of data from one tier to another is controlled by a memory transfer controller 214. Memory transfer controller 214 is responsive to control signals from an analysis module 212 or a user interface 216. In response to these control signals, memory transfer controller 214 directs transfers from one memory tier to another.

Memory migration system 200 further comprises a usage monitor 208, to monitor usage of each tier of memory and accumulate usage statistics. Multiple application programs may be running on a computer or network of computers at the same time. Each application will attempt to make its own usage of memory. Thus, instructions and data may be accessed from a hard drive in tier 1 during execution of one more programs. Some applications may transfer data between the hard drive and a computer processor's cache on a very frequent basis. Some applications may do this on an infrequent basis. Usage monitor 208 of system 200 monitors file access rates and provides data to analysis module 212. Usage monitor 208 may also monitor and provide data relating to access times, file size, etc.

Usage statistics may comprise how often a file is accessed or modified. Using usage statistics, embodiments can dynamically and intelligently allocate access to the various memory implementations available in the system. These statistics may show that certain files are being accessed from one tier of memory often enough to justify transferring the file to a higher tier of memory. Conversely, usage statistics may show that certain files are being accessed so infrequently as to justify storing them in a lower tier of memory. Thus, a file may at one point in time be allocated to fast local disk, while at another point in time be allocated to remote disk. Similarly, a file allocated to tape during one part of the day may be allocated to remote disk during another part of the day. By examining historical and current trends in usage, embodiments may reallocate memory efficiently and automatically. Thus, embodiments monitor and maintain historical information concerning file usage. Historical data may form a baseline against which to compare current usage trends. Examples of trending metrics comprise last access time, time of modification, file size, length of time to perform certain operations (read, write, modify, etc.), and frequency of access over time. Embodiments also monitor where the file is located, special access requirements arising from application functional requirements, performance requirements, and so forth.

Analysis module 212 analyzes usage data determined by usage monitor 208. Thus, for example, analysis module 212 may determine that files of a monitored application should be transferred to a remote disk in tier 2 because frequency of file usage is low or a file has become dormant for a considerable length of time. Thus, analysis module 212 may comprise use threshold parameters for each tier of memory. Usage below a given threshold may prompt analysis module 212 to send a control signal to transfer controller 214 to direct transfer of files from one tier of memory to a lower tier of memory. Analysis module 212 may obtain analysis parameters by way of a user interface 216, which comprises a keyboard, mouse, and video monitor with a windows-like menu to enable user input and control of the functions of system 200.

Memory storage usage by a computer or a network of computers may vary because of a variety of factors, including time of day. For example, a data base program accessed by a network of computers may be in high use during the business hours of the day, while after hours its use is in low demand. Indeed, some programs will place high demand upon memory storage access during one part of a day, while other programs place high demand upon memory access during another part of the day. Thus, embodiments enable memory to be allocated according to time-demand.

Memory storage usage may also be determined according to a Service Level Agreement (SLA) providing for allocation of memory access according to service level specifications. For example, one user may have a SLA providing a level of service affording a higher priority of memory access than a second user under a different SLA. Embodiments enable memory access allocation according to such agreements, as well as reallocation according to a change in SLA. A service level data store 210 stores information concerning levels of service accorded to certain users, computer terminals, or application programs. For example, service level for a given application may be given a high-priority during the hours of 2 to 4 pm. These service level specifications are input to service level data store 210 by way of user interface 216. Thus, service level data store 210 may be occasionally updated when a change in service level specifications occurs or a new level of service is implemented.

The up-to-date service level specifications are available to analysis module 212 to influence whether and when to signal transfer controller 214 to direct a memory migration of files and/or blocks of data. Thus, in one embodiment, analysis module 212 may determine from a given level of service accorded to a particular application during a specified time of day, what memory migration, if any, should occur. Analysis module 212 would then signal transfer controller 214 to direct the prescribed memory migration. When a peak-use period begins or ends, a migration of files from one memory tier to another memory tier may therefore be directed according to service level specifications stored in service level data store 210 and transmitted to analysis module 212.

Where data is stored in the plurality of memory tiers is a function of class of service with each class comprising a different set of service level specifications. A system may therefore implement a variety of service classes. The service level specifications for a class of service may depend on a variety of factors including business considerations as well as classes of information to be handled. Business considerations include such issues as availability, recoverability, security, performance and value. Information classes may include e-mail, decision support, data warehouse, audio/visual, etc. The data may be in blocks, objects, or files in a number of formats such as binary and compressed bitmap, and may contain information or computer code. Thus, a variety of service level specifications may be taken into consideration when making memory access allocation decisions.

As previously noted, user interface 216 enables user input of service level specifications to service level data store 210, and enables user input of threshold and control parameters to analysis module 212. User interface 216 also enables a user to intervene to cause transfer controller 214 to direct a transfer of files from one memory tier to another. Thus, a system administrator may therefore intervene to allocate memory for user-directed purposes. These user-directed changes may be made subject to automatic migration determined by analysis module 212 or may, in some embodiments or modes of operation, override the migration decisions of analysis module 212.

In one embodiment, memory transfer controller 214 comprises circuitry for generating or triggering memory read and write signals in response to control signals from analysis module 212 or user interface 216. Memory transfer controller 214 may trigger or issue a write signal to transfer data from a higher memory tier to a lower memory tier and may trigger or issue a read signal to transfer data from a lower tier to a higher tier. Thus, for example, analysis module 214 may determine, based on usage data obtained from usage monitor 206, that files of a program currently stored in a higher tier could be stored in a lower tier consistent with service level specifications obtained from service level data source 210. Transfer controller 214 will then trigger or issue a write signal to copy the files from the higher tier memory to the lower tier memory.

Transfer controller 214 also comprises circuitry to enable access of data regardless of to where the data has migrated. For example, suppose that a file stored on a local hard drive is determined to be infrequently used and that analysis module 212 determines the file to be transferable to remote disk under the specifications of a given service level agreement. When the transfer is complete, the data is located in a different memory device with a different address. The process of the application program that seeks access to the migrated data must logically be able to find the data at the new address. This can be accomplished in several ways. For example, in one embodiment, a directory is created that maintains a map between a filename known to the application and the location in a memory device where the data in the file corresponding to the filename is stored. The directory is updated for each migration of the data of the file. An application program may therefore ascertain the current address of data in memory from the directory. Thus, in this non-virtual embodiment, the application is informed of the actual current address of the migrated data.

As another example, in a virtual storage system a central logical switch 218 of transfer controller 214 may be implemented to automatically form a logical connection between the requesting application and the migrated data. Thus, in one embodiment, central logical switch 218 of transfer controller 214 receives a memory access request from an executing process of an application program. The memory access request contains a virtual address. The central logic switch maintains an up-to-date map between the virtual address and an actual address of data of an application program. Thus, the received virtual address is mapped into the actual current address of migrated data. In such an embodiment, therefore, the application program process that requests data access need not know the actual address of the data.

Figure 3:
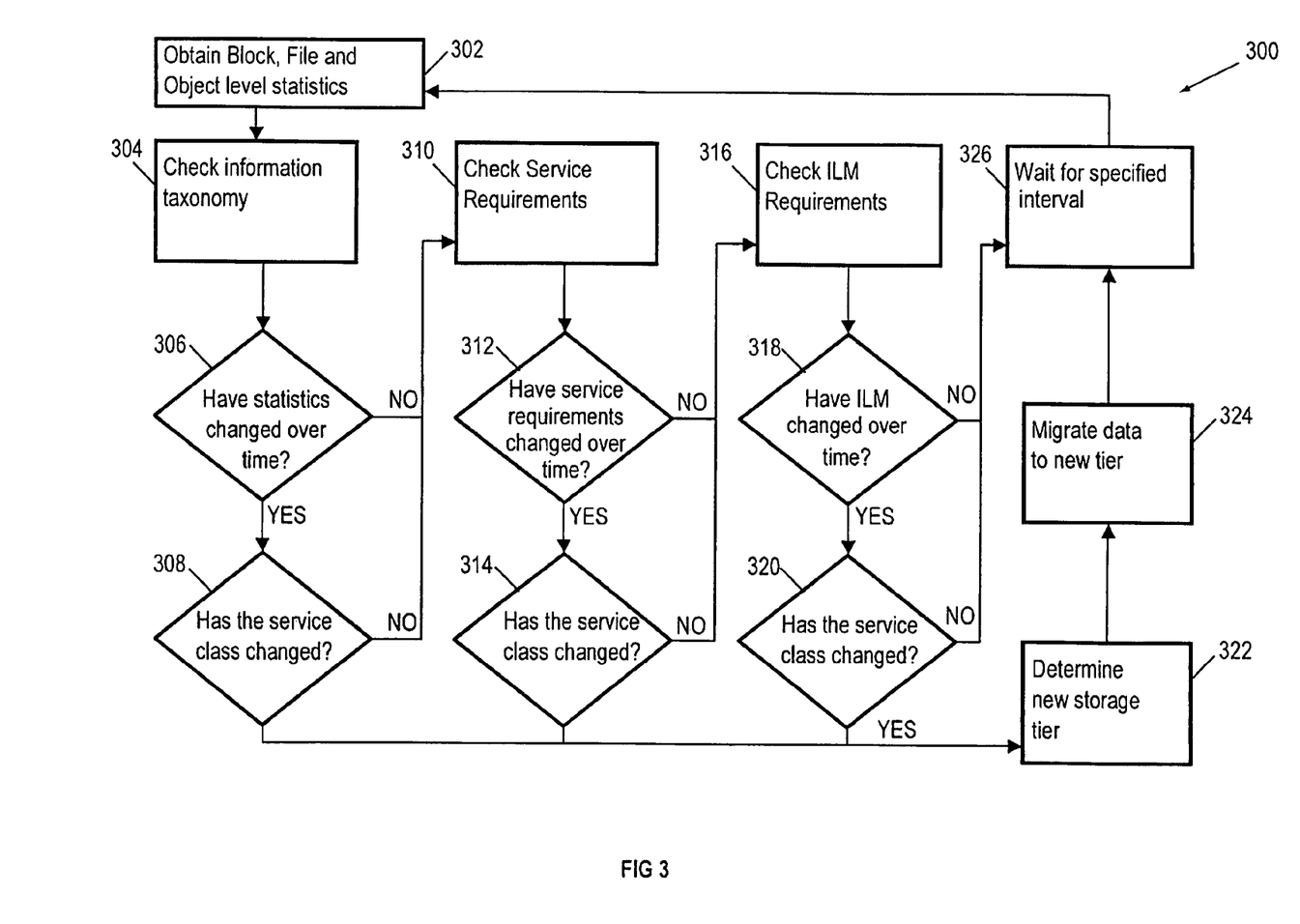
FIG. 3 depicts a flow chart of an embodiment for achieving auto-migration of data among a plurality of memory storage devices.

FIG. 3 shows a flow chart 300 of an embodiment for analysis of usage statistics and service level specifications to determine memory migration. At element 302 the system obtains block, file and object level usage statistics. These statistics are examined (element 304). The system determines whether statistics have change over time (element 306). If not, logic flows to element 310. If statistics have changed over time, then the system determines whether the service class has changed (element 308). Recall that each service class is associated with its own set of service level specifications. If statistics have not changed over time, logic flows to element 310. If the service class has changed, then logic flows to element 322 to determine a new storage tier for the data.

At element 310, the system checks service specifications including availability, recoverability, security and performance requirements. The system then determines whether service requirements have changed over time (element 312). If not, logic flows to element 316. If service requirements have changed over time, the system determines if the service class has changed (element 314). If not, logic flows to element 316. If the service class has changed, logic flows to element 322 to determine a new storage tier.

At element 316, the system checks Information Life-cycle Management (ILM) requirements, including path management, point in time requirements for data placement, and policies comprising events, triggers and actions. The system then determines whether ILM requirements have changed over time (element 318). If not, logic flows to element 326. If ILM requirements have changed over time, the system then determines if the service class has changed (element 318). If not, then logic flows to element 326. If the service class has changed then logic flows to element 322 to determine a new storage. At element 322, a new storage tier is determined. Then, the system migrates data to the new tier (element 324). The system then waits for a specified time interval and the process continues at element 302.

Some embodiments of the invention are implemented as a program product for use with a computer system such as, for example, the system 116 shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive or write-able CD disk); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing in a data processing system, to cause the system to perform a series of operations for auto-migration of data among a plurality of multiple memory storage device. The series of operations generally include monitoring access of application program data stored in one or more of the multiple memory storage devices for one or more application programs. Also, the operations include determining service level specifications for one or more application programs. The operations further include determining from monitored access and service level specifications a change in memory allocation for the data of one more of the application programs. The operations further include automatically transferring data between multiple memory storage devices to achieve an allocation of the data among the plurality of multiple storage devices according to the determined change in memory allocation. The operations may further comprise comparing a baseline set of memory storage specifications with actual memory usage. The operations may also comprise determining a change in memory allocation arising from a change in a service level specified for an application program. The operations may yet further comprise determining a frequency of access of data of an application program, or determining duration of access time.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for auto-migration of data between multiple memory storage devices, comprising:

receiving and storing service level specification terms of a Storage Level Agreement (SLA) associated with a class of service, wherein the service level specification terms are particular to the class of service among a set of classes of services, each class in the set having its own set of the service level specification terms, wherein the service level specification terms associated with the class of service comprise access time, access rate, usage frequency, time of day, file size, and length of time of modification of blocks, files and objects;

providing three or more tiers of memory, selected from types consisting of cache, fast disk, remote disk, hard disk, disk array, offline, tape, and back-up media;

monitoring access of application program data stored in one or more of the three or more tiers of memory for one or more application programs, the monitoring of access comprising monitoring the service level specification terms of access time, access rate, usage frequency, time of day, file size, and length of time of modification of blocks, files and objects;

comparing data from the monitored access to the terms of the SLA to determine whether another allocation of the application program data among the three or more tiers of memory is indicated;

determining from the monitored access and the service level specification terms a change in memory allocation for the data of the one or more of application programs; and automatically transferring application program data between the three or more tiers of memory to achieve an allocation of the application program data among the three or more tiers of memory if the comparison of the monitored access to terms of the SLA indicates that another allocation of the application program data among the three or more tiers of memory is required to meet the service level specification terms of the SLA.

2. The method of claim 1, further comprising determining a baseline set of memory storage specifications for data of the one or more application programs.

3. The method of claim 1, further comprising determining a change in memory allocation arising from a change in a service level specified for any of the one or more application programs.

4. The method of claim 1, further comprising enabling a user to input a change in memory allocation for any of the one or more application programs.

5. The method of claim 1, wherein monitoring access of the application program data comprises determining a frequency of access of data of any of the one or more application programs.

6. The method of claim 1, wherein monitoring access of the application program data comprises determining duration of access of a file of any of the one or more application programs.

7. The method of claim 1, wherein monitoring access of the application program data comprises determining a size of a file of any of the one or more application programs.

8. The method of claim 1, wherein monitoring access of the application program data comprises determining a length of time to access data from the three or more tiers of memory.

9. An auto-migration memory storage system, comprising:

a plurality of memory storage units each associated with a pre-determinable performance characteristic;

a data store to store service level specifications for one or more application programs, wherein the service level specification have terms for a Storage Level Agreement (SLA) associated with a class of service, wherein the service level specification terms are particular to the class of service among a set of classes of services, each class in the set having its own set of service level specification terms, wherein the service level specification terms associated with the class of service comprise access time, access rate, usage frequency, time of day, file size, and length of time of modification of blocks, files and objects;

a monitoring component to monitor access of data of application programs stored in at least one of the memory storage units, wherein the data comprises the service level specification terms of access time, access rate, usage frequency, time of day, file size, and length of time of modification of blocks, files and objects;

an analysis component to determine from the monitored access and service level specifications a reallocation of data among the plurality of memory storage units; and a transfer control component to transfer data from one memory storage unit to another in response to the determined reallocation if comparison by the monitoring component to the terms of the SLA indicates that another allocation of the data among the plurality of memory storage units is required to meet the service level specification terms of the SLA.

10. The system of claim 9, further comprising a user interface to enable a user to impose a desired reallocation of data among the memory storage units.

11. The system of claim 9, wherein the monitoring component determines a baseline of one or more access characteristics.

12. The system of claim 11, wherein the analysis component compares the baseline characteristics to actual memory access over time.

13. The system of claim 9, wherein the analysis component compares a baseline of one or more access characteristics to actual memory access over time.

14. A machine-accessible storage medium containing instructions for performing memory auto-migration, which, when executed by a machine, cause said machine to perform operations, comprising:

receiving and storing service level specification terms of a Storage Level Agreement (SLA) associated with a class of service, wherein the service level specification terms are particular to the class of service among a set of classes of services, each class in the set having its own set of the service level specification terms, wherein the service level specification terms associated with the class of service comprise access time, access rate, usage frequency, time of day, file size, and length of time of modification of blocks, files and objects;

providing three or more tiers of memory, selected from types consisting of cache, fast disk, remote disk, hard disk, disk array, offline, tape, and back-up media;

monitoring access of application program data stored in one or more of the three or more tiers of memory for one or more application programs, the monitoring of access comprising monitoring the service level specification terms of access time, access rate, usage frequency, time of day, file size, and length of time of modification of blocks, files and objects;

comparing data from the monitored access to the terms of the SLA to determine whether another allocation of the application program data among the three or more tiers of memory is indicated;

determining from the monitored access and the service level specification terms a change in memory allocation for the data of the one or more of application programs; and automatically transferring application program data between the three or more tiers of memory to achieve an allocation of the application program data among the three or more tiers of memory if the comparison of the monitored access to terms of the SLA indicates that another allocation of the application program data among the three or more tiers of memory is required to meet the service level specification terms of the SLA.

15. The machine accessible storage medium of claim 14, wherein the operations further comprise comparing a baseline set of memory storage specifications with actual memory usage.

16. The machine accessible storage medium of claim 14, wherein the operations further comprise determining a change in memory allocation arising from a change in a service level specified for any of the one or more application programs.

17. The machine accessible storage medium of claim 14, wherein monitoring the access of the application program data comprises determining a frequency of access of data of the one or more application programs.

18. The machine-accessible storage medium of claim 14, wherein monitoring the access of the application program data comprises determining a duration of the access of a file of the one or more application programs.

19. The machine-accessible storage medium of claim 14, wherein monitoring the access of the application program data comprises determining a size of a file of the one or more application programs.

* * * * *